United States Patent
Krug

(10) Patent No.: US 9,810,113 B2
(45) Date of Patent: Nov. 7, 2017

(54) ENGINE LUBRICATION HEATING SYSTEM

(71) Applicant: The Boeing Company, Chicago, IL (US)

(72) Inventor: David Scott Krug, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 456 days.

(21) Appl. No.: 14/641,987

(22) Filed: Mar. 9, 2015

(65) Prior Publication Data

US 2016/0265400 A1      Sep. 15, 2016

(51) Int. Cl.

| F01M 5/02 | (2006.01) |
| F01M 11/02 | (2006.01) |
| F01M 5/00 | (2006.01) |
| F01D 25/18 | (2006.01) |
| F16C 33/66 | (2006.01) |
| F02C 7/277 | (2006.01) |
| F01M 1/08 | (2006.01) |

(52) U.S. Cl.
CPC .............. *F01M 5/007* (2013.01); *F01D 25/18* (2013.01); *F01M 5/001* (2013.01); *F01M 11/02* (2013.01); *F02C 7/277* (2013.01); *F16C 33/6637* (2013.01); *F01M 1/08* (2013.01)

(58) Field of Classification Search
CPC ........ F01M 5/007; F01M 5/001; F01M 5/005; F01M 5/02; F01M 5/021; F01M 11/02; F01D 25/18; F16C 33/6637
See application file for complete search history.

(56) References Cited

U.S. PATENT DOCUMENTS

| 4,815,431 A | 3/1989 | Yorita et al. |
| 5,517,959 A | 5/1996 | Kato et al. |
| 7,992,535 B2 | 8/2011 | Steiner et al. |
| 8,479,486 B2 | 7/2013 | Angst |
| 2005/0199210 A1* | 9/2005 | Biess ............ F01M 5/021 123/179.19 |
| 2011/0286844 A1* | 11/2011 | Takayanagi ........ F16N 39/04 416/95 |

(Continued)

FOREIGN PATENT DOCUMENTS

| EP | 0143091 | 5/1985 |
| EP | 2728965 | 5/2014 |

OTHER PUBLICATIONS

Guy Norris and Mark Wagner, *Boeing 777*, published by Motorbooks International Publishers & Wholesalers, 1996, p. 66.

(Continued)

*Primary Examiner* — Jacob Amick
(74) *Attorney, Agent, or Firm* — Thompson Hine LLP

(57) ABSTRACT

A lubrication distribution system for an engine is disclosed. The system includes a source of lubricant for the engine and at least one feed line fluidly connected to the source of lubricant. The feed line includes a wall defining a passageway and an orifice. The feed line terminates at the orifice, and lubricant flows through the passageway and exits the feed line through the orifice. The feed line also includes a heating element contained substantially within the wall of the feed line and located at or directly upstream of the orifice. The heating element is selectively activated to heat the lubrication flowing through the passageway and exiting the orifice.

20 Claims, 6 Drawing Sheets

(56) References Cited

U.S. PATENT DOCUMENTS

2012/0241439 A1* 9/2012 Hashimoto .............. F01M 5/00
  219/553
2016/0084126 A1* 3/2016 Jo ........................... F01M 1/18
  123/572

OTHER PUBLICATIONS

Guy Norris, Flight Global Article, "Power to the People," Mar. 3, 1999, http://www.flightglobal.com/news/articles/power-to-the-people-48716/.

* cited by examiner

ENGINE LUBRICATION HEATING SYSTEM

FIELD

The disclosed system relates to a lubrication distribution system for an engine and, more particularly, to a lubrication distribution system for an engine having a heating element located at an exit orifice of a passageway to heat lubricant.

BACKGROUND

An auxiliary power unit (APU) may be used for ground power, main engine starting, and backup electrical power during flight of an aircraft. In one approach, the APU may be a relatively small gas turbine engine installed within an unpressurized tail cone of the aircraft. The oil system typically includes an integral oil tank, an oil pump, a heat exchanger, and a distribution system for distributing oil to the bearings, bushings, gears, and secondary systems of the engine. The distribution system may include a primary feed line that splits into secondary feed lines. An orifice or a squirt jet may be located at a terminus of each secondary feed line. The orifices or squirt jets are used to control distribution of oil within the engine.

When an aircraft is at cruise altitude or operating in cold climates while on the ground, the oil within the engine becomes cold. This significantly increases the viscosity of the oil. Higher viscosity oil may not always flow sufficiently through the oil distribution system, thereby creating issues within the engine due to insufficient lubrication.

The oil pump of the engine is usually mechanically driven and has a fixed displacement. Those skilled in the art will appreciate that because the oil pump is limited by the pressure that may be produced, the combination of higher viscosity oil due to cold temperatures and the relatively small diameter orifices located within the distribution system may sometimes result in oil starvation at various locations of the engine during a cold start-up. Specifically, reduced or truncated oil flow may occur at locations such as bearings, bushings, and other engine components during start-up of the engine at extremely cold temperatures, thereby resulting in wear of engine components, or extended start-up times.

In order to mitigate the effects of cold oil during start-up, various solutions have been developed. If the APU is a gas turbine engine type 2 turbine oil, which has a relatively low viscosity, may be used. Moreover, a full-time heater pad for a bearing enclosure of the engine may be provided to heat the oil. However, the full-time heater pad draws power from the aircraft electrical system, thus increasing flight electrical loads and thereby increasing fuel burn.

If the APU is a piston engine, such as APUs used on commercial trucks or emergency generators, then an oil reservoir heater that remains turned on when the engine is not operating to pre-heat oil may be used. However, this approach uses continuous power consumption, which requires dedicated infrastructure. For a mobile engine, this also requires an approach to disconnect from the power infrastructure. Additionally or alternatively, a piston engine may include an oil bypass system that short circuits the flow of oil returning to the oil reservoir of the engine in order to accelerate localized heating of the oil. However, this approach may not completely mitigate the effects of cold oil during start-up and the engine is still impacted by increased fluid shear losses. Accordingly, there is a continuing need in the art for an effective approach to provide oil to various components within an engine during start-up at colder ambient temperatures.

SUMMARY

In one aspect, a lubrication distribution system for an engine is disclosed. The system includes a source of lubricant for the engine and at least one feed line fluidly connected to the source of lubricant. The feed line includes a wall defining a passageway and an orifice. The feed line terminates at the orifice, and lubricant flows through the passageway and exits the feed line through the orifice. The feed line also includes a heating element contained substantially within the wall of the feed line and located at or directly upstream of the orifice. The heating element is selectively activated to heat the lubrication flowing through the passageway and exiting the orifice.

In another aspect, a control system for heating lubricant of an engine is disclosed. The system includes a reservoir for containing lubricant, at least one feed line fluidly connected to the reservoir, at least one power wire for supplying electrical current to the heating elements, and a control module in communication with the at least one power wire. The feed line comprises a wall defining a passageway, an orifice, and a heating element contained substantially within the wall of the feed line and located at or directly upstream of the orifice. The heating element is selectively activated to heat the lubricant flowing through the passageway and exiting the orifice. The control module receives as input an activation signal and a reservoir temperature. The activation signal indicates an impending start-up of the engine. The control module includes control logic for determining the impending start-up of the engine occurs based on receipt of the activation signal. The control module also includes control logic for determining whether the reservoir temperature is below a target start-up temperature. Finally, the control module includes control logic for activating the at least one power wire to allow the electrical current to the heating element in response to receiving the activation signal and the reservoir temperature being below the target start-up temperature.

In yet another aspect, a method of heating lubricant within an engine system is disclosed. The engine system includes an engine and a reservoir, the method comprises receiving an activation signal and a reservoir temperature by a control module, where the activation signal indicates an impending engine start-up. The method also includes determining whether the reservoir temperature is below a target start-up temperature by the control module. The method further includes supplying electrical current to at least one power wire in response to receiving the activation signal and the reservoir temperature being below the target start-up temperature by the control module. The at least one power wire is in communication with the control module and the at least one power wire supplies electrical current to at least one heating element. Finally, the method includes activating the at least one heating element of the engine system. The engine system includes at least one feed line fluidly connected to the reservoir, and the feed line comprises a wall defining a passageway, an orifice, and the heating element, where the heating element is contained substantially within the wall of the feed line and located at or directly upstream of the orifice.

DETAILED DESCRIPTION

Figure 1:
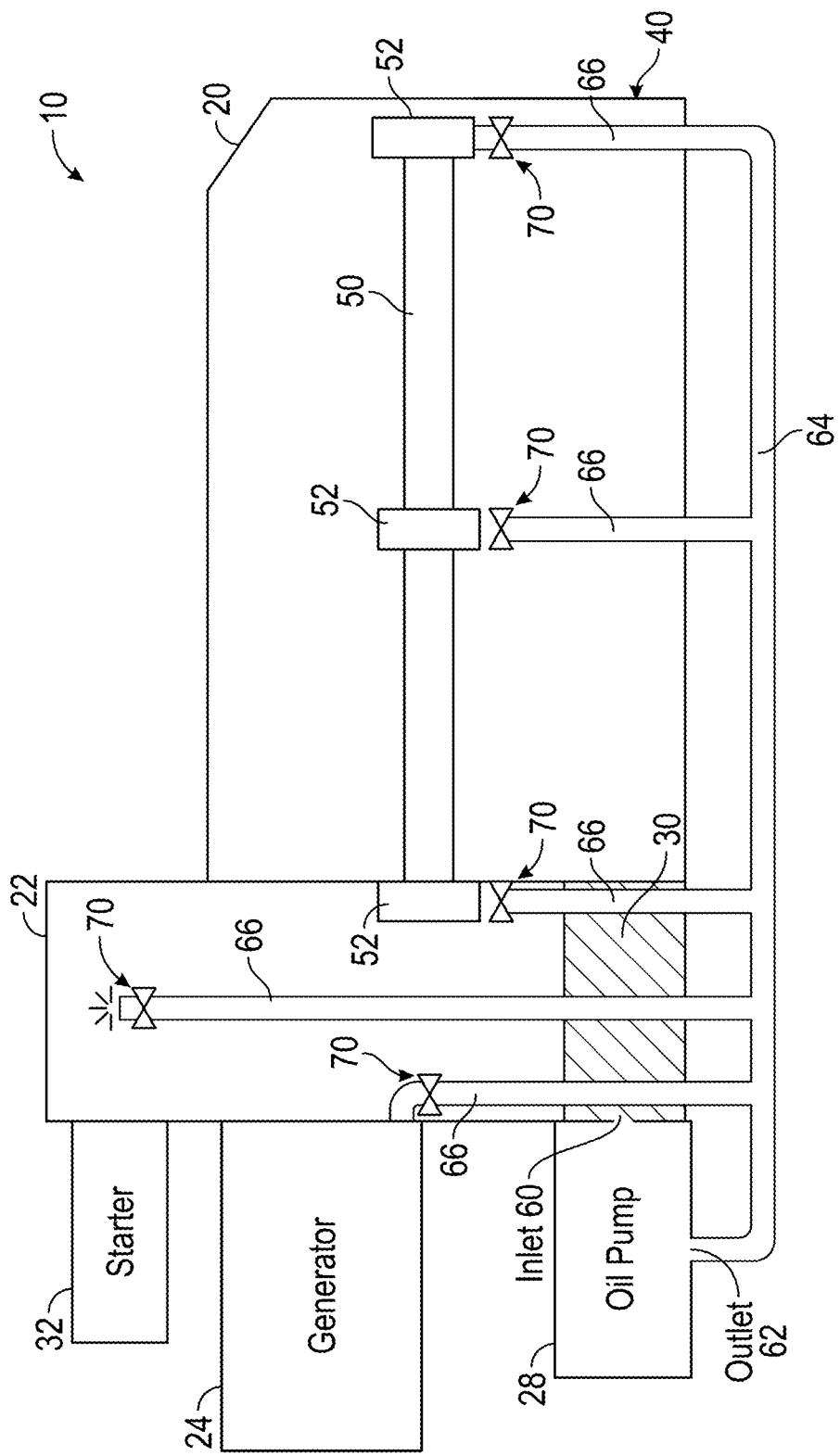
FIG. 1 is a schematic diagram of the disclosed engine and the engine lubrication heating system.

As shown in FIG. 1, the disclosed engine lubrication heating system 10 according to an aspect of the disclosure may include an engine 20, a gearbox 22 connected to the engine 20, a generator 24, a pump 28, a reservoir 30, and a starter 32. A distribution system 40 may be used to distribute a lubricant, such as oil, within the engine 20, the gearbox 22, and the generator 24, which is described in greater detail below. In one exemplary embodiment, the engine 20 may be an auxiliary power unit (APU) used for ground power, main engine starting, and backup electrical power during flight of an aircraft. In another embodiment, the engine 20 may be an auxiliary power unit used for backup power on a commercial truck. The APU may be, for example, a gas turbine engine, a spark ignited engine, or a compression ignition engine.

Those skilled in the art will appreciate that while an engine for an APU within an aircraft is described, the disclosed distribution system 40 may be used in a variety of other applications as well. For example, automobile engines, commercial truck APUs, and emergency power generators utilize similar oil distribution systems for lubrication. Additionally, a wind turbine may also utilize the disclosed distribution system 40 for lubricating components within a gearbox. Moreover, although oil is discussed, it is to be understood that the distribution system 40 is not limited to distributing only oil. Instead, other types of lubricants may be used as well such as, for example, grease.

Continuing to refer to FIG. 1, the engine 20 may include an engine shaft 50 extending in a longitudinal direction. The shaft 50 may be either a turbine shaft if the engine 20 is a gas turbine engine, or, alternatively, a crankshaft if the engine 20 is a spark ignited or compression engine. A plurality of bearings 52 surround the engine shaft 50. It is to be understood that the bearings 52 may be supported by bearing supports 54 (shown in FIG. 2). For purposes of clarity and simplicity, the bearing supports 54 are not illustrated in FIG. 1.

The reservoir 30 may be used to contain lubricant, such as oil, for the engine 20. The pump 28 may include an inlet 60 fluidly connected to the reservoir 30 and an outlet 62 fluidly connected to a primary feed line 64 of the distribution system 40. As seen in FIG. 1, the primary feed line 64 of the distribution system 40 splits off into a plurality of secondary feed lines 66. Thus, the secondary feed lines 66 are each fluidly connected to a source of lubricant (i.e., the pump 28 and the reservoir 30) through the primary feed line 64.

The secondary feed lines 66 may each terminate in an opening or orifice 70. The orifice 70 may be used to distribute oil flowing from the secondary feed line 66. Specifically, the orifice 70 may be located directly adjacent to a component of the engine system 20 requiring lubrication such that oil exiting the secondary feed line 66 through the orifice 70 will contact and lubricate a component requiring lubrication. Some examples of components that require lubrication include, but are not limited to, bearings, bushings, gears and secondary engine systems such as oil cooled generators. If the engine 20 is an internal combustion engine, some examples of components that require lubrication may also include valves, pistons and the crankshaft.

Figure 2:
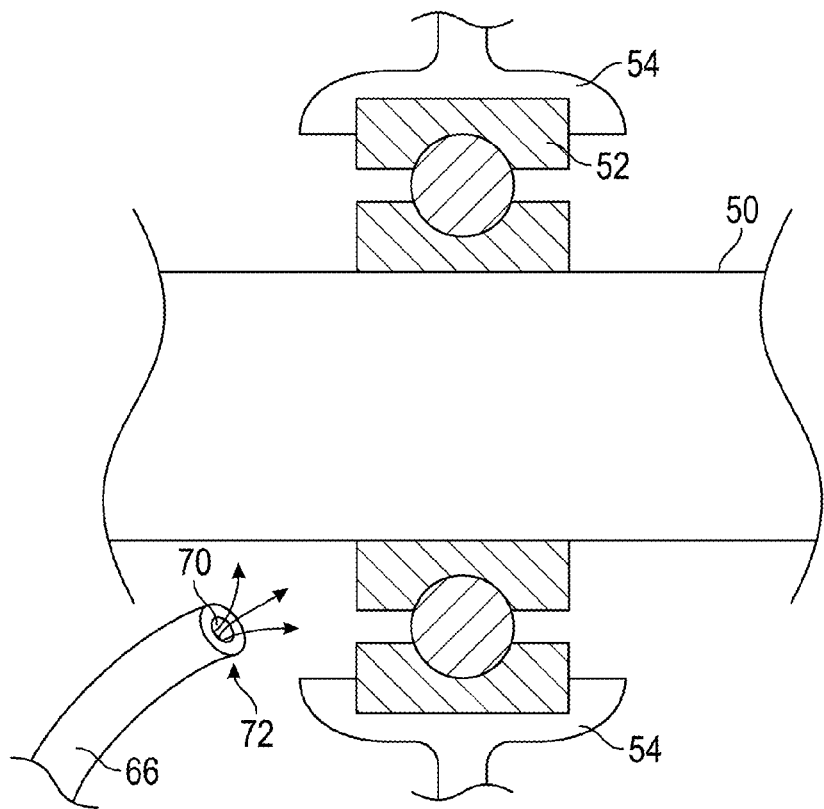
FIG. 2 is an enlarged view of a single bearing of the engine shown in FIG. 1.

In the embodiment as shown in FIG. 1, three of the orifices 70 of the secondary feed lines 66 are located directly adjacent to one of the bearings 52 of the engine 20. Each orifice 70 provides lubrication to a respective bearing 52. Another secondary feed line 66 is illustrated within the gearbox 22, and may be used to provide oil to one or more gearsets located within the gearbox 22 (not illustrated). The remaining secondary feed line 66 may be positioned to distribute oil into the generator 24. In one embodiment, the orifice 70 may be part of a squirt jet 72, which is shown in FIG. 2. FIG. 2 is an enlarged view of a single bearing 52 and the squirt jet 72 positioned directly adjacent to the bearing 52. As seen in FIG. 2, the squirt jet 72 may be used to spray oil onto the bearing 52 during operation of the engine 20 for lubrication.

Figure 3:
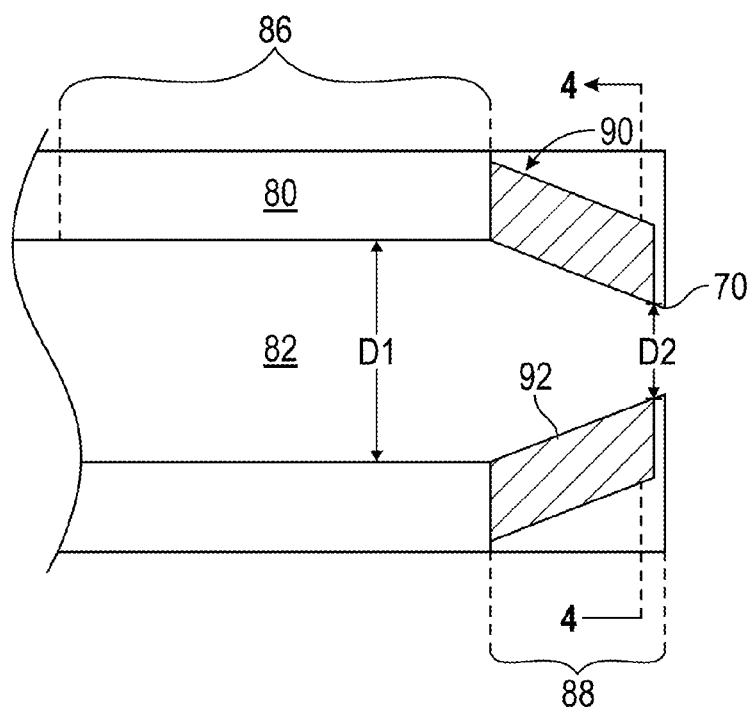
FIG. 3 is a cross-sectioned view of one of the secondary feed lines shown in FIG. 1, the secondary feed line including a heating element.

FIG. 3 is an enlarged, cross-sectioned side view of one the secondary feed lines 66, taken at the orifice 70. As seen in FIG. 3, the secondary feed line 66 may include a wall 80. In the embodiment as shown in FIG. 3, the wall 80 is substantially tubular and defines a passageway 82 for the flow of oil or lubricant therein. The wall 80 may be a tube, duct or integral part of a machined or cast engine structure or component. The wall 80 also defines the orifice 70. The passageway 82 of the secondary feed line 66 defines a first diameter D1 and a second diameter D2. The first diameter D1 is measured along a substantially straight portion 86 of the passageway 82, and the second diameter D2 is measured at the orifice 70. As seen in FIG. 3, the passageway 82 may include a narrowing portion 88, which tapers inwardly or otherwise decreases in dimension in a direction towards the orifice 70. Thus, the first diameter D1 of the passageway 82 is greater than the second diameter D2 of the passageway 82. It is to be understood that while a generally circular cross-sectional area of the passageway 82 is described, the passageway 82 should not be limited only a circular cross-section. For example, in another embodiment, the passageway 82 may include an elliptical cross-section instead, or other shapes for inclusion in a machined or cast engine component or engine structure.

Continuing to refer to FIG. 3, a heating element 90 may be located at or directly upstream of the orifice 70. As explained in greater detail below, the heating element 90 may be selectively activated in order to heat the oil or lubricant flowing through the passageway 82 and exiting the orifice 70. The heating element 90 may be located either at or directly adjacent the orifice 70 such that the heating element 90 provides localized heating of the oil immediately before the oil exits the passageway 82 through the orifice 70.

Specifically, the heating element 90 may be activated at an impending start-up of the engine 20 (FIG. 1), which is explained in detail below. The heating element 90 may be activated based on the temperature of the oil contained in the reservoir 30 (FIG. 1), and is also explained in greater detail below. As seen in FIG. 3, the heating element 90 is contained substantially within the wall 80 of the passageway 82. In other words, the heating element 90 is an integral part of the wall 80 of the passageway 82. Thus, the heating element 90 may not impede the flow of oil as the oil flows towards the orifice 70.

Figure 4:
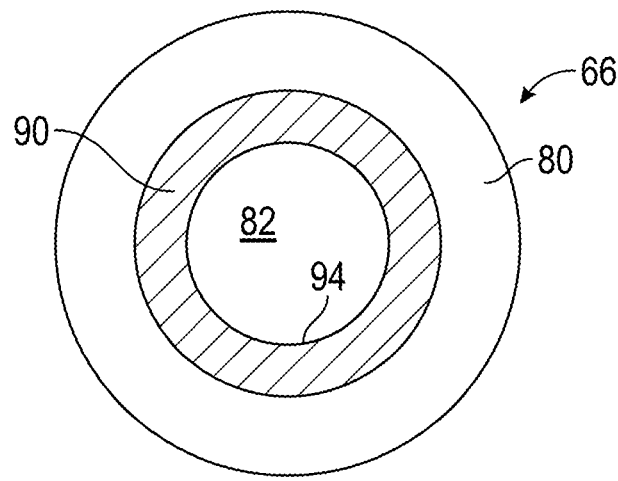
FIG. 4 is a cross-sectioned view of the secondary feed line shown in FIG. 3, taken along section line 4-4.

FIG. 4 is a section view of the secondary feed line 66 shown in FIG. 3, taken along section line 4-4. As seen in FIG. 4, the heating element 90 completely circumscribes or surrounds an outer periphery 94 of the passageway 82. Turning back to FIG. 3, the heating element 90 may include a generally frustoconical profile. However, it is to be understood that the illustration shown in FIG. 3 is merely exemplary in nature, and the heating element 90 may include other geometries that generally correspond with the tapered portion 88 of the passageway 82.

Referring generally to FIGS. 3 and 4, those of ordinary skill in the art will appreciate that as fluid flows through a restriction, the fluid shear losses may increase. Thus, as oil flows through the narrowing portion 88 and exits the orifice 70 of the secondary feed line 66, the fluid shear losses of the oil may increases as the passageway 82 tapers or narrows in dimension. If the heating element 90 is activated, the heating element 90 locally heats oil located at or directly adjacent the orifice 70, thereby reducing the viscosity of the oil located along the inner surface 92 of the wall 80 of the secondary feed line 66. The reduced viscosity of the oil around the outer periphery 94 of the passageway 82 results in an increased flow rate of the oil. Thus, the heating element 90 may mitigate the fluid shear losses that occur due to the reduced diameter of the orifice 70. This may be especially advantageous during a cold start-up of the engine 20, since the viscosity of cold oil is relatively high.

Figure 5:
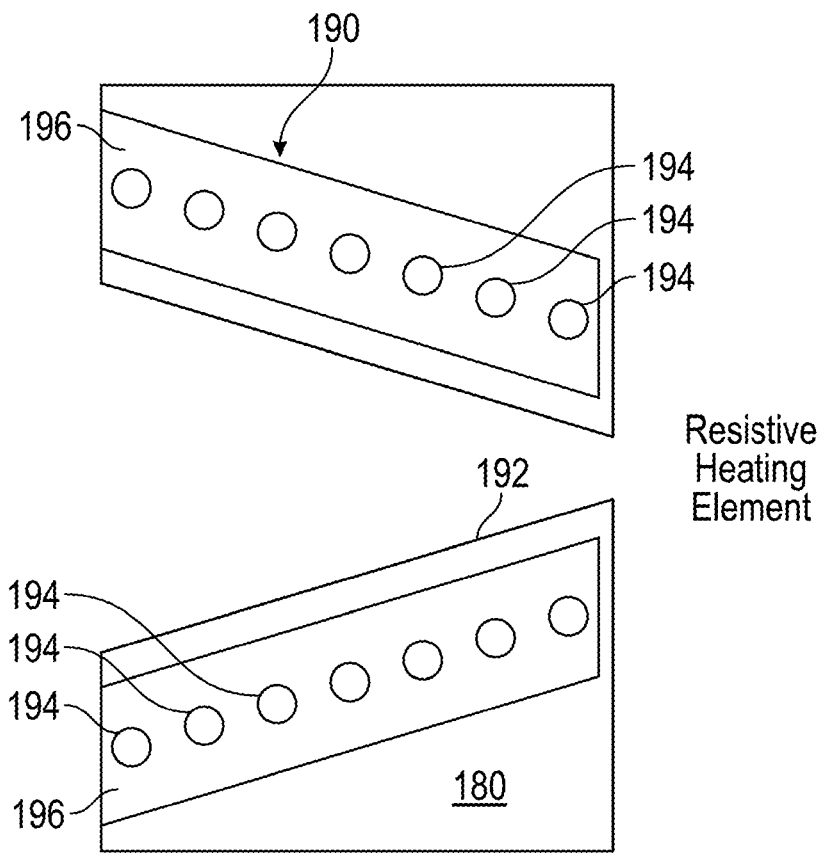
FIG. 5 is an embodiment of the heating element shown in FIG. 3 including resistive heating elements.
Figure 6:
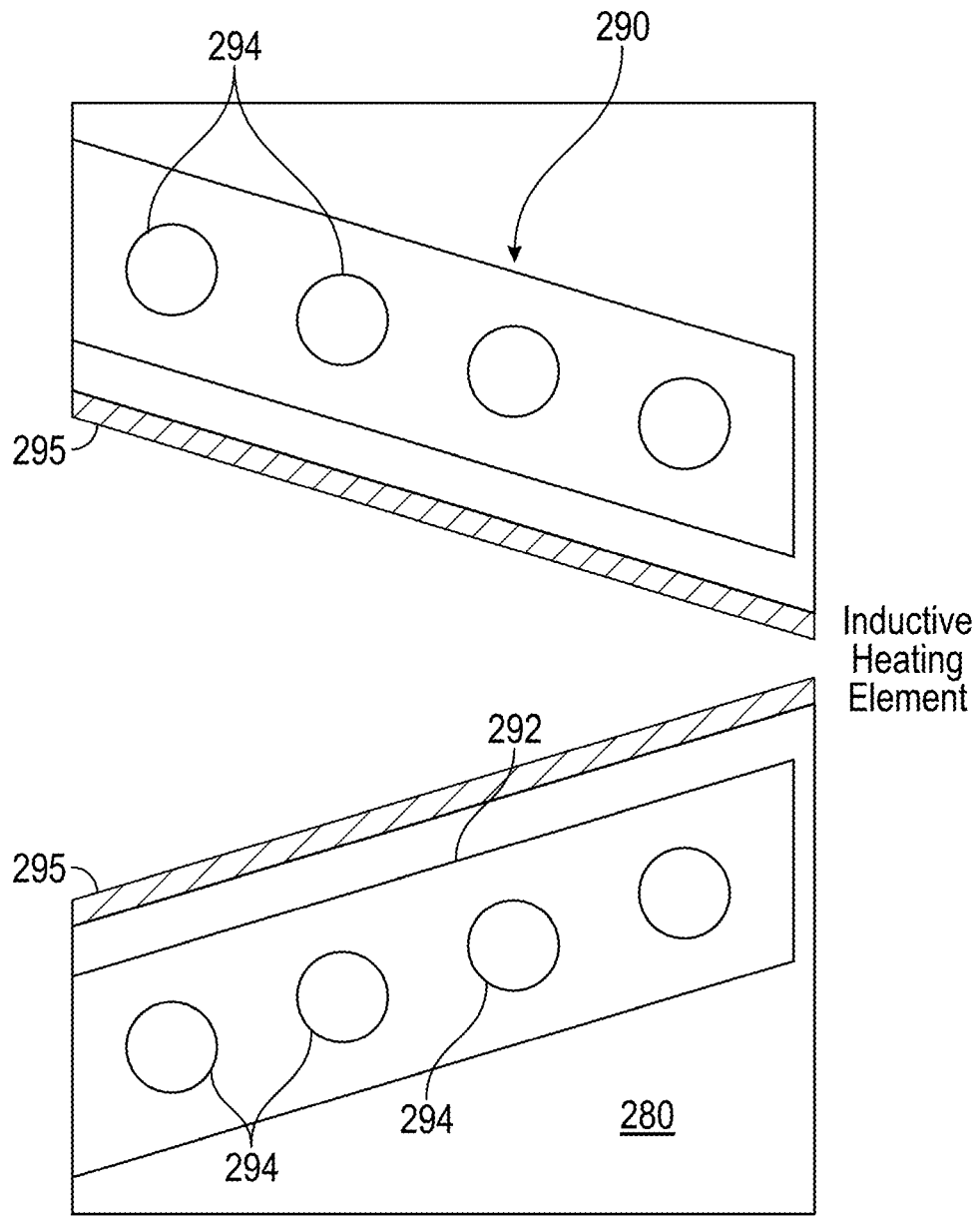
FIG. 6 is an embodiment of the heating element shown in FIG. 3 including inductive heating elements.

In one embodiment, the heating element 90 may include either resistive heating elements (illustrated in FIG. 5) or inductive heating elements (illustrated in FIG. 6) for heating the oil exiting the orifice 70. It is to be understood that the reference numbers in FIGS. 5 and 6 including the same last two digits as the reference numbers in FIG. 3 refer to similar components. Turning to FIG. 5, a resistive heating element 190 is illustrated, and is positioned along an inner surface 192 of a wall 180. The resistive heating element 190 may include a plurality of resistive elements 194 embedded within a ceramic matrix 196, where the resistive elements 194 generate heat. Specifically, the resistive elements 194 convert electrical current into heat. The resistive elements 194 are electrically isolated from the distribution system 40 and the engine 20. Some examples of resistive elements 194 include, but are not limited to, a coil or strip of wire made from nichrome. Turning now to FIG. 6, an inductive heating element 290 is illustrated, and is positioned directly adjacent an inner surface 292 of a wall 280. Specifically, the inductive heating element 290 is positioned within the wall 280. A metallic ring 295 may be disposed along the inner surface 292 of the wall 280. The inductive heating element 290 may include inductive elements 294 such as magnetic coils that induce heat along the inner surface 292 at the metallic ring 295. The inductive heating element 290 electrically isolates the inductive elements 294 from the lubrication distribution system 40.

Figure 7:
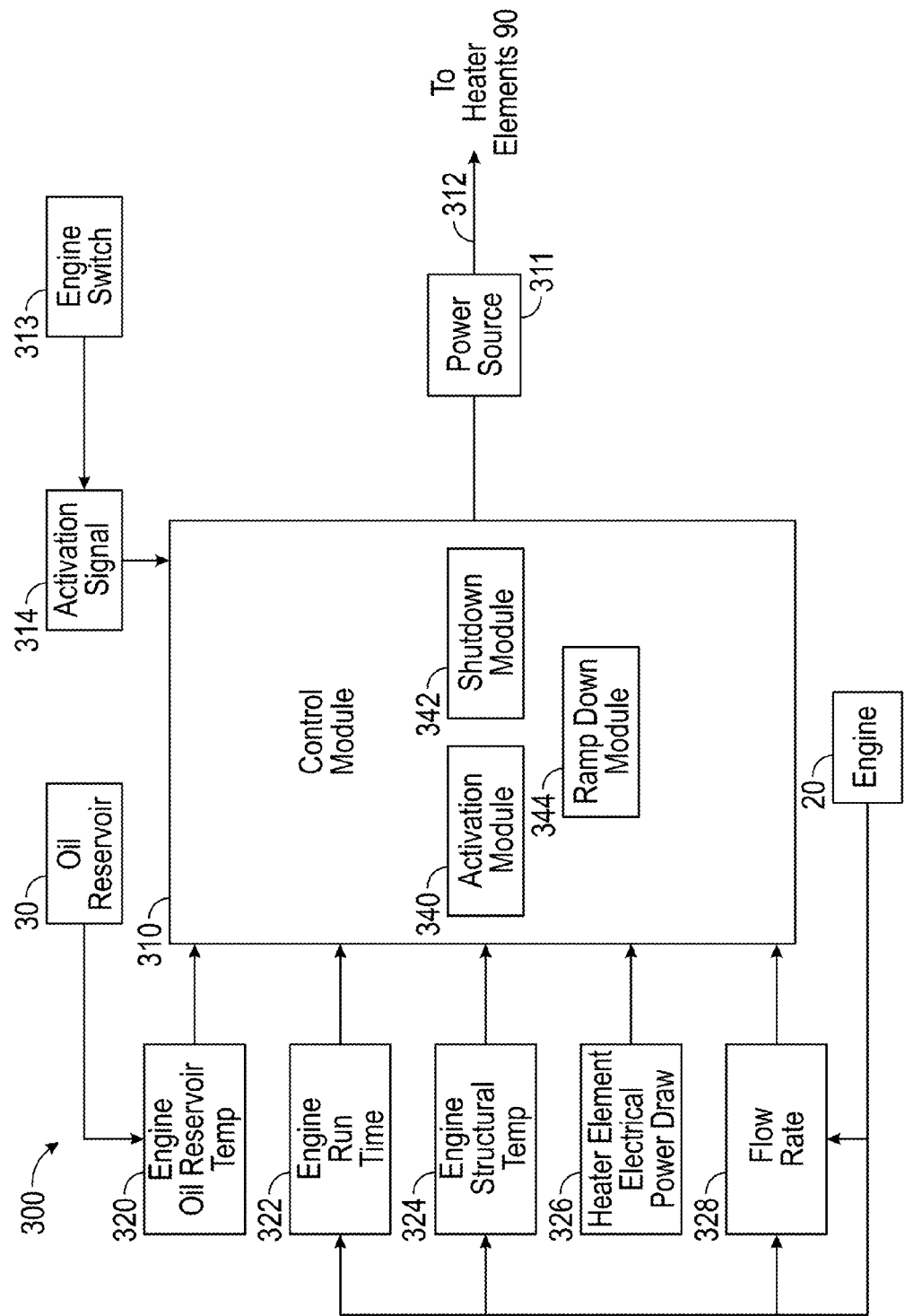
FIG. 7 is a block diagram illustrating a control system for activating the engine lubrication heating system shown in FIG. 1.

FIG. 7 is a block diagram illustrating an exemplary control system 300. The control system 300 may be used to selectively activate the heating elements 90 (shown in FIG. 3) of the lubrication distribution system 40 (shown in FIG. 1). The control system 300 includes a control module 310. The control module 310 may refer to, or be part of, an application specific integrated circuit (ASIC), an electronic circuit, a combinational logic circuit, a field programmable gate array (FPGA), a processor (shared, dedicated, or group) comprising hardware or software that executes code, or a combination of some or all of the above, such as in a system-on-chip. In one non-limiting embodiment, the control module 310 may be an engine control unit (ECU). Those skilled in the art will readily appreciate that while a single control module 310 is illustrated in the figures and described, the control module 310 may also include multiple control modules as well.

The control module 310 may be in communication with one or more controllable power sources 311 connected to power wires 312. Alternatively, in another embodiment the power sources 311 may be omitted, and instead the control module 310 provides the electrical power, and is in communication with the power wires 312 to provide electrical power. The power wires 312 supply electrical current to the heating elements 90 (FIG. 3) of the distribution system 40. The control module 310 may be in signal communication with an engine switch 313. The engine switch 313 generates an activation signal 314 indicative of an impending engine start-up. Specifically, once the engine switch 313 is energized, then the activation signal 314 is generated and the engine 20 may then be turned over or rotated. However, the actual turnover of the engine 20 may be delayed for a few seconds (i.e., 1-30 seconds).

Referring to both FIGS. 1 and 7, the control module 310 may also be in signal communication with various sensors of the engine 20, the reservoir 30, and the power sources 311 to monitor various operating conditions. Specifically, the control module 310 may receive as input an engine oil reservoir temperature 320, an engine run time 322, an engine structural temperature 324, a heater element electrical power draw 326, and a flow rate 328.

The engine oil reservoir temperature 320 may be generated by a temperature sensor (not illustrated) located within the reservoir 30, and is indicative of a temperature of the oil contained within the reservoir 30. The engine run time 322 may be a calculated value, and is indicative of the total time the engine 20 has been operating since start-up. In one embodiment, the engine run time 322 may be calculated by another control module. Alternatively, in another embodiment the control module 310 may calculate the engine run time 322. The engine run time 322 may be calculated based on a counter (not illustrated) that is initiated once the engine exceeds a specific rotation speed.

In the event the engine 20 is an internal combustion engine, then the engine structural temperature 324 may be monitored. The engine structural temperature 324 may be measured by a temperature sensor located in a selected area of the engine 20 (not shown) indicative of the temperature of oil flowing through the engine 20. Oil flowing through primary feed line 64 and the secondary feed lines 66 may increase in temperature due to heat transfer from the selected area of the engine 20. The heater element electrical power draw 326 is indicative of the total current being supplied to the heating elements 90 (shown in FIG. 1) of the distribution system 40 by the power wires 312, and may be measured by a current meter (not shown). The flow rate 328 is an indication of the flow rate of oil located within the primary feed line 64 of the distribution system 40 (shown in FIG. 1). In one embodiment, the flow rate 328 is measured by a flow meter located within the primary feed line 64 of the distribution system 40. Alternatively, in another embodiment, the control module 310 may calculate the flow rate 328 based on an engine speed and displacement of the pump 28, and oil system pressure downstream of the pump 28 (FIG. 1).

Referring to FIGS. 1 and 7, the control module 310 may include an activation sub-module 340, a shutdown sub-module 342, and a ramp down module 344. The activation sub-module 340 determines whether the control module 310 may activate the power wires 312, thereby allowing electrical current to flow though the power wires 312 and to the heating elements 90 (shown in FIG. 3). It is to be understood that while FIG. 3 illustrates only a single heating element 90, the power wires 312 supply electrical current to each heating element 90 located within the secondary feed lines 66 of the distribution system 40. Specifically, it is understood that all of the heating elements 90 within the distribution system 40 are activated simultaneously.

The activation sub-module 340 receives as input the activation signal 314 as well as the engine oil reservoir temperature 320. The activation sub-module 340 includes control logic for determining an impending engine start-up occurs based on receipt of the activation signal 314. The activation signal 314 also includes control logic for determining whether the engine oil reservoir temperature 320 is below a target start-up temperature. The activation sub-module 340 includes control logic for instructing the control module 310 to activate the power sources 311 connected to the power wires 312 in response to receiving the activation signal 314 and the engine oil reservoir temperature 320 being below the target start-up temperature.

Continuing to refer to FIGS. 1 and 7, the target start-up temperature of the engine oil reservoir temperature 320 is indicative of the oil viscosity within the reservoir 30. If the oil contained within the reservoir 30 is above the target start-up temperature, this means that the viscosity of the oil is sufficiently low enough for a successful engine start-up. A successful engine start-up may mean the viscosity of the oil contained within the reservoir 30 is sufficiently low enough such that oil may flow though the secondary feed lines 66 and exit the distribution system 40 through the orifices 70 at a flow rate to provide sufficient lubrication to the various components of the engine 20 at start-up of the engine.

The shutdown sub-module 342 determines whether the control module 310 may cease to supply electrical current to the power wires 312 via the power source 311. The shutdown sub-module 342 receives as input the engine oil reservoir temperature 320, the engine run time 322, and the engine structural temperature 324 (if the engine 20 is an internal combustion engine). Referring to FIGS. 1, 3, and 7, the shutdown sub-module 342 of the control module 310 determines a temperature of oil or lubricant flowing through the passageway 82 and exiting the orifice 70 based on the engine oil reservoir temperature 320, the engine run time 322, and the engine structural temperature 324. The shutdown sub-module 342 includes control logic to determine whether the temperature of oil flowing through the passageway 82 and exiting the orifice 70 is above a deactivation temperature threshold. The shutdown sub-module 342 includes control logic for instructing the control module 310 to cease supplying electrical current to the power wires 312 in response to the temperature of oil flowing through the passageway 82 and exiting the orifice 70 exceeding the deactivation temperature threshold.

The deactivation temperature threshold of the oil at the orifices 70 is indicative of the viscosity of the oil or lubricant flowing through the passageway 82 and exiting the orifice 70. Specifically, the deactivation temperature threshold indicates the oil or lubricant flowing through the passageway 82 and exiting the orifice 70 has been sufficiently warmed such that an associated viscosity value of the warmed oil is lowered to or below an engine specific defined viscosity threshold. Those of ordinary skill in the art will appreciate that once the oil viscosity is lowered to the viscosity threshold, further heating of the oil provides negligible benefits during engine start-up and the associated run up in operating speed.

The ramp down sub-module 344 determines whether the control module 310 may deliver a ramped down or reduced amount of electrical current to the power wires 312. Specifically, the ramp down sub-module 344 may incrementally reduce the electrical current to the power wires 312 based on the inner surface 92 of the wall 80 of the secondary feed line 66 at the heating element 90 (FIG. 3), which is explained below. The ramp down sub-module 344 may be part of a system included in the control system 300. In one embodiment, the ramp down sub-module 344 substantially prevents the control system 300 from heating the oil or lubricant located within the distribution system 40 above its rated temperature limits. Alternatively, in another embodiment, the ramp down sub-module 344 may substantially prevent the control system 300 from heating the oil above another predetermined temperature limit as well.

The ramp down sub-module 344 receives as input the engine oil reservoir temperature 320, the engine run time 322, the engine structural temperature 324 (if the engine 20 is an internal combustion engine), the heater element electrical power draw 326, and the flow rate 328. The ramp down sub-module 344 of the control module 310 includes control logic to determine the temperature of the inner surface 92 of the wall 80 of the secondary feed line 66 at the heating element 90 (FIG. 3) based on the engine oil reservoir temperature 320, the engine run time 322, the engine structural temperature 324 (if the engine 20 is an internal combustion engine), the heater element electrical power draw 326, and the flow rate 328. In other words, the ramp down sub-module 344 of the control module 310 determines a surface temperature of the heating element 90 based on the inputs. The ramp down sub-module 344 determines if the temperature of the inner surface 92 of the wall 80 of the secondary feed line 66 at the heating element 90 (FIG. 3) exceeds a ramp down temperature threshold.

The ramp down sub-module 344 includes control logic for instructing the control module 310 to reduce or ramp down the electrical current supplied to the power wires 312 in response to the temperature of the inner surface 92 of the wall 80 of the secondary feed line 66 at the heating element 90 (FIG. 3) exceeding the ramp down temperature threshold. In one embodiment, the ramp down sub-module 344 includes control logic for ramping down the electrical current supplied to the heating elements 90 based on the temperature of the inner surface 92 of the wall 80 of the secondary feed line 66 at the heating element 90. In other words, the amount of reduction in electrical current supplied to the heating elements 90 is based on the current temperature of the heating element 90. For example, if the temperature of the inner surface 92 of the wall 80 of the secondary feed line 66 at the heating element 90 is more than 230° C., or more than 5% above the ramp down temperature threshold, then the ramp down sub-module 344 may instruct the control module 300 to reduce the amount of electrical current supplied to the power wires by 25%. If the temperature of the inner surface 92 of the wall 80 of the secondary feed line 66 is not reduced below the ramp down temperature threshold in a prescribed time period (i.e., 60 seconds) once the electrical current supplied power wire is reduced by 25%, then the ramp down sub-module 344 would continue to reduce the electrical current by increments of 25% until the ramp down temperature threshold is no longer exceeded.

Referring to FIGS. 1, 3, and 7, the ramp down temperature threshold of the inner surface 92 of the wall 80 of the secondary feed line 66 may be selected to ensure that oil exiting the orifices 70 is not overheated. In other words, the ramp down sub-module 344 ensures that the oil is not heated above its respective manufactures rated temperature.

Figure 8:
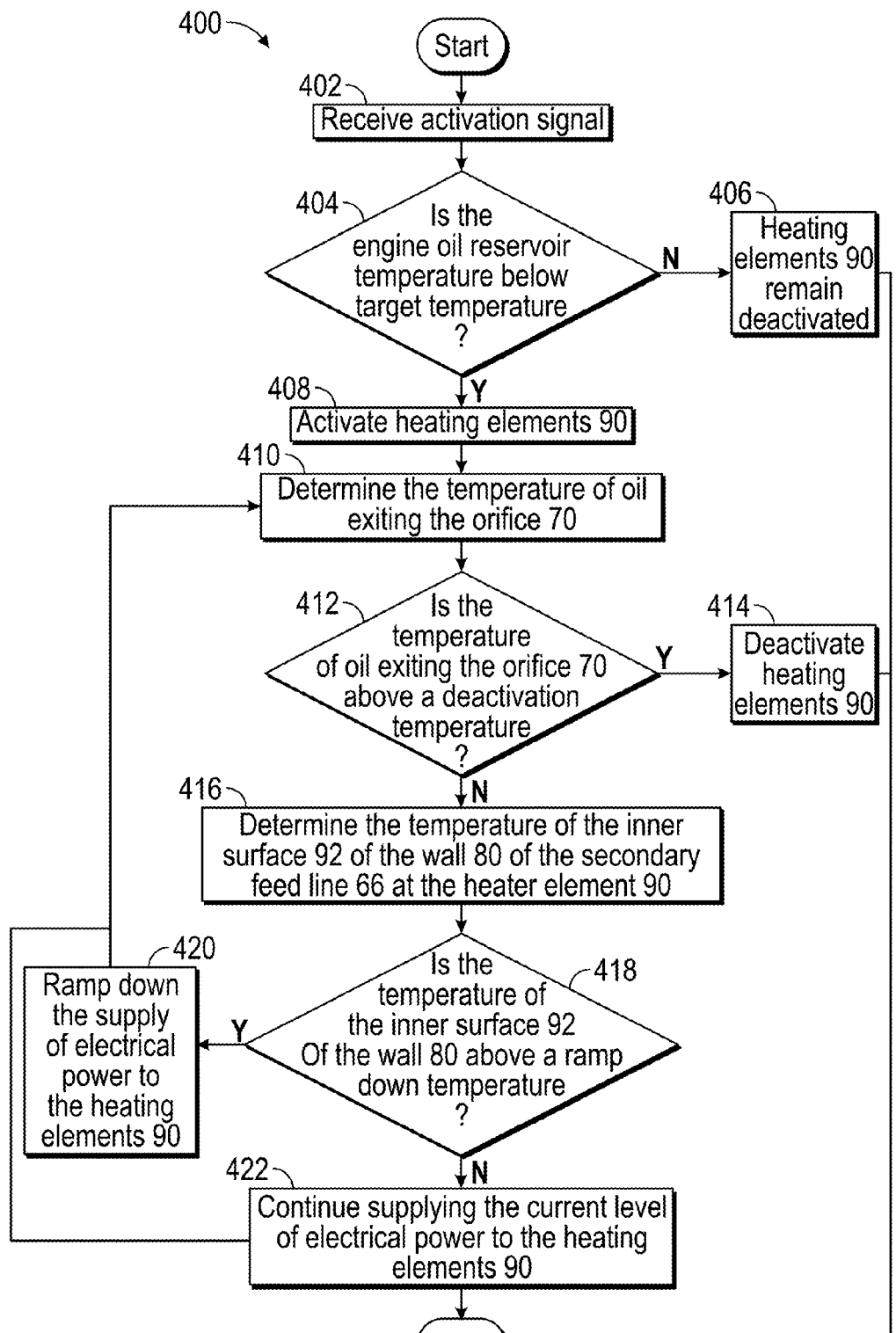
FIG. 8 is an exemplary process flow diagram illustrating a method for activating the engine lubrication heating system.

FIG. 8 is an exemplary process flow diagram illustrating a method 400 for operating the control system 300 shown in FIG. 7. Referring to FIGS. 1, 3, and 7-8, method 400 may begin at block 402. In block 402, the control module 310 detects an impending engine start-up. Specifically, once the activation sub-module 340 of the control module 310 receives the activation signal 314 from the engine switch 313 (FIG. 7), then method 400 may proceed to block 404.

In block 404, the activation sub-module 340 of the control module 310 determines whether the engine oil reservoir temperature 320 is below the target start-up temperature. If the engine oil reservoir temperature 320 is above the target temperature, then method 400 may proceed to block 406. In block 406, the heating elements 90 of the secondary feed line 66 of the distribution system 40 remain deactivated, and method 400 may then terminate.

If the engine oil reservoir temperature 320 is below the target start-up temperature, method 400 may proceed to block 408. In block 408, the activation sub-module 340 of the control module 310 includes control logic to activate the power wires 312, thereby allowing electrical current to flow though the power wires 312 and to the heating elements 90. Method 400 may then proceed to block 410.

In block 410, the shutdown sub-module 342 of the control module 310 determines the temperature of oil or lubricant flowing through the passageway 82 and exiting the orifice 70. Method 400 may then proceed to block 412.

In block 412, the shutdown sub-module 342 determines whether the temperature of oil flowing through the passageway 82 and exiting the orifice 70 is above the deactivation temperature threshold. If the temperature of oil flowing through the passageway 82 and exiting the orifice 70 is above a deactivation temperature threshold, then method 400 may proceed to block 414. In block 414, the shutdown sub-module 342 includes control logic for instructing the control module 310 to cease supplying electrical current to the power wires 312. Method 400 may then terminate.

Referring back to block 412, if the temperature of oil flowing through the passageway 82 and exiting the orifice 70 is below a deactivation temperature threshold, then method 400 may proceed to block 416. In block 416, the ramp down sub-module 344 of the control module 310 determines the temperature of the inner surface 92 of the wall 80 of the secondary feed line 66 at the heating element 90 (FIG. 3). Method 400 may then proceed to block 418.

In block 418, the ramp down sub-module 344 of the control module 310 determines if the temperature of the inner surface 92 of the wall 80 of the secondary feed line 66 at the heating element 90 is above the ramp down temperature threshold. If the temperature of the inner surface 92 of the wall 80 of the secondary feed line 66 at the heating element 90 is above the ramp down temperature threshold, then method 400 may proceed to block 420. In block 420, the ramp down sub-module 344 includes control logic for instructing the control module 310 to reduce the electrical current supplied to the power wires 312. Method 400 may then proceed back to block 410.

Referring back to block 418, if the temperature of the inner surface 92 of the wall 80 of the secondary feed line 66 at the heating element 90 is below the ramp down temperature threshold, then method 400 may proceed to block 422. In block 422, electrical current continues to be supplied to the heating elements 90 at full power. Method 400 may then proceed back to block 410.

Referring generally to the figures, the disclosed engine lubrication system may ensure that sufficient lubrication is supplied to various components of the engine system during start-up of the engine at altitude or in an extremely cold climate. Those of ordinary skill in the art will readily appreciate that the disclosed heating elements reduce the viscosity of the lubricant exiting the system, thereby increasing the speed of the engine startup. The disclosed heating elements may also result in increased life of the starter, a reduced size of the starter, and reduced bearing and gear train wear during start-up. Moreover, some engines currently available include a full-time heater to heat oil. In contrast, the disclosed engine lubrication heating system consumes less power than the full-time heaters currently available since the disclosed heating elements are eventually deactivated after engine start-up.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A lubrication distribution system for an engine, the system comprising:
   a source of lubricant for the engine; and
   at least one feed line fluidly connected to the source of lubricant, the feed line comprising:
      a wall defining a passageway and an orifice, the feed line terminating at the orifice, wherein lubricant flows through the passageway and exits the feed line through the orifice; and
      a heating element contained substantially within the wall of the feed line and located at or directly upstream of the orifice, the heating element selectively activated to heat the lubrication flowing through the passageway and exiting the orifice.

2. The lubrication distribution system of claim 1, wherein the heating element completely circumscribes an outer periphery of the passageway of the feed line.

3. The lubrication distribution system of claim 1, wherein the feed line is fluidly connected to a primary feed line.

4. The lubrication distribution system of claim 3, wherein the primary feed line splits off into a plurality of feed lines.

5. The lubrication distribution system of claim 1, wherein the source of lubricant is a reservoir that contains the lubricant.

6. The lubrication distribution system of claim 5, wherein the heating element is selectively activated based on the temperature of the lubricant within the reservoir.

7. The lubrication distribution system of claim 1, wherein the heating element is activated during an impending start-up of the engine.

8. The lubrication distribution system of claim 1, wherein the heating element includes elements for heating lubricant selected from the group consisting of: resistive heating elements and inductive heating elements.

9. A control system for heating lubricant of an engine, comprising:
- a reservoir for containing lubricant;
- at least one feed line fluidly connected to the reservoir, the feed line comprising a wall defining a passageway, an orifice, and a heating element contained substantially within the wall of the feed line and located at or directly upstream of the orifice, the heating element selectively activated to heat the lubricant flowing through the passageway and exiting the orifice;
- at least one power wire for supplying electrical current to the heating element; and
- a control module in communication with the at least one power wire, the control module receiving as input an activation signal and a reservoir temperature, wherein the activation signal indicates an impending start-up of the engine, the control module including control logic for:
  - determining whether the reservoir temperature is below a target start-up temperature; and
  - activating the at least one power wire to allow the electrical current to the heating element in response to receiving the activation signal and the reservoir temperature being below the target start-up temperature.

10. The control system of claim 9, wherein the target start-up temperature is indicative of a viscosity of the lubricant within the reservoir.

11. The control system of claim 9, wherein the control module determines a temperature of lubricant exiting the orifice based on the reservoir temperature, an engine run time, and an engine structural temperature.

12. The control system of claim 11, wherein the control module includes control logic to determine whether the temperature of lubricant exiting the orifice is above a deactivation temperature threshold.

13. The control system of claim 12, wherein the control module includes control logic to cease supplying the electrical current to the at least one power wire in response to the temperature of lubricant exiting the orifice exceeding the deactivation temperature threshold.

14. The control system of claim 9, wherein the control module determines a temperature of an inner surface of the wall of the feed line at the heating element based on the reservoir temperature, an engine run time, a heater element electrical power draw, engine structural temperature, and a flow rate.

15. The control system of claim 14, wherein the control module ramps down the electrical current supplied to the at least one power wire in response to the temperature of the inner surface of the wall of the feed line at the heating element exceeding a ramp down temperature threshold.

16. The control system of claim 9, wherein the reservoir is fluidly connected to a primary feed line, wherein the primary feed line branches off into a plurality of feed lines.

17. The control system of claim 9, wherein the plurality of feed lines each include a respective heater element, and wherein each of the respective heating elements are supplied the electrical current by the at least one power wire.

18. A method of heating lubricant within an engine system, the engine system including an engine and a reservoir, the method comprising:
- receiving an activation signal and a reservoir temperature by a control module, wherein the activation signal indicates an impending engine start-up;
- determining whether the reservoir temperature is below a target start-up temperature by the control module;
- supplying electrical current to at least one power wire in response to receiving the activation signal and the reservoir temperature being below the target start-up temperature by the control module, wherein the at least one power wire is in communication with the control module and the at least one power wire supplies electrical current to at least one heating element; and
- activating the at least one heating element of the engine system, wherein the engine system includes at least one feed line fluidly connected to the reservoir, the feed line comprising a wall defining a passageway, an orifice, and the heating element, wherein the heating element is contained substantially within the wall of the feed line and is located at or directly upstream of the orifice.

19. The method of claim 18, comprising ceasing supplying the electrical current to the at least one power wire in response to a temperature of lubricant exiting the orifice exceeding a deactivation temperature threshold.

20. The method of claim 18, comprising reducing the electrical current supplied to the at least one power wire in response to a temperature of an inner surface of the wall of the feed line at the heating element exceeding a ramp down temperature threshold.

* * * * *